Aug. 26, 1969  J. M. STAUB ET AL  3,463,026
MINE MACHINE CUTTER CHAINS AND THE LIKE
Filed Sept. 22, 1967
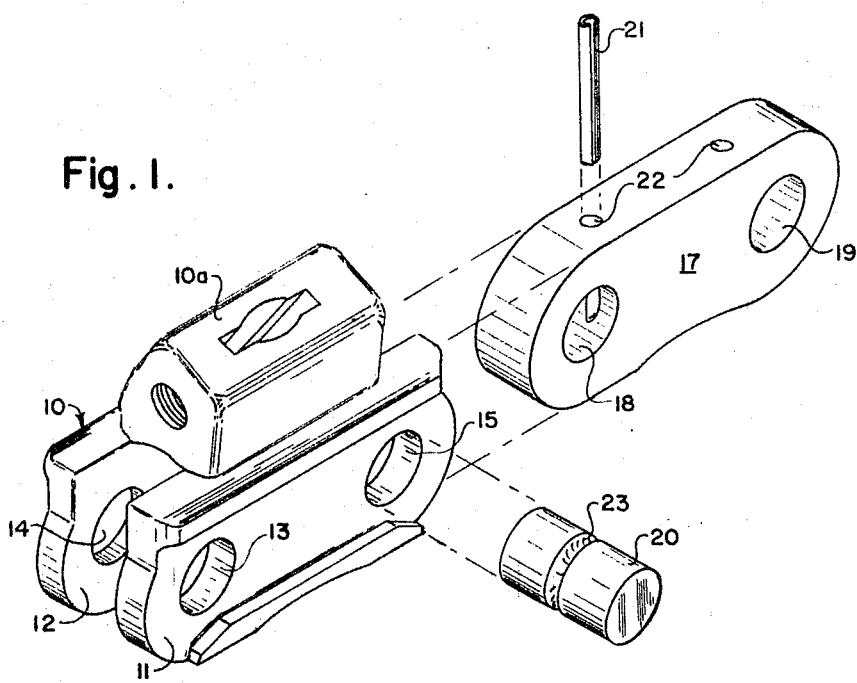
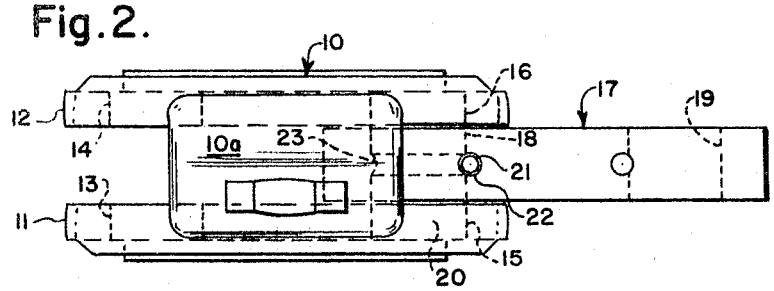
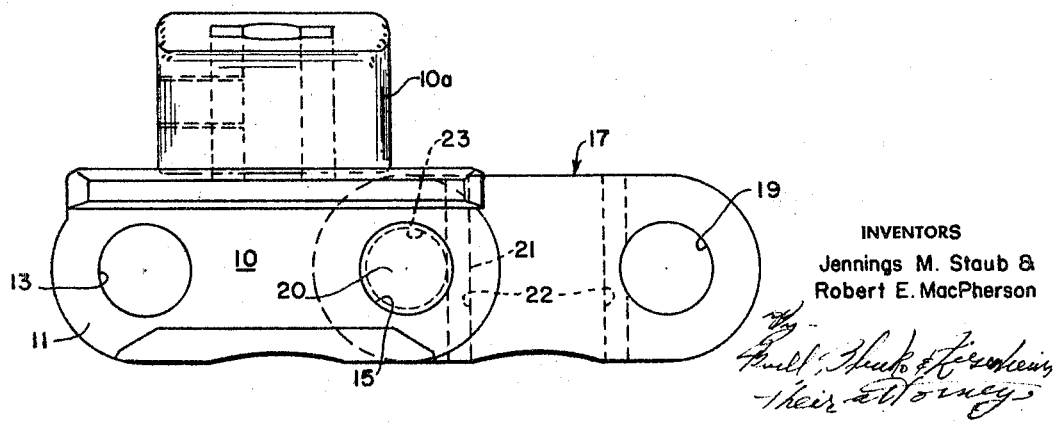
INVENTORS
Jennings M. Staub &
Robert E. MacPherson

United States Patent Office 3,463,026
Patented Aug. 26, 1969

3,463,026
MINE MACHINE CUTTER CHAINS AND THE LIKE
Jennings M. Staub and Robert E. MacPherson, Pittsburgh, Pa., assignors to Bertrand P. Tracy Company
Filed Sept. 22, 1967, Ser. No. 669,754
Int. Cl. F16g *13/08;* E21c *13/00*
U.S. Cl. 74—254                                        6 Claims

ABSTRACT OF THE DISCLOSURE

A mining machine cutter chain having toothed cutter links with spaced side straps having circular pin openings at each end, a connector link fitting between the side straps and having like pin openings, a chordal passage at each opening in the connector link intersecting the openings therein and having a frictional lock pin and a connector pin slidable in the openings of the side straps and connector with an annular groove receiving the locking pin.

---

This invention relates to mine machine cutter chains and the like and particularly to a novel connection means for such chains.

Cutters for mining machines are in the form of a chain of cutting links connected together in such a way that they may pass around drive and idler sprockets to form the cutting head of the machine. The connection between links is by means of a connector and pin carried in the past in bushings mounted in openings in the connectors. There are many problems to be met in making the connection between links. The pins must be held in place by some means which protects them from being removed, the link should not be over-stressed as a result of the insertion of the pin. The pins should obtain some lubrication and there must be resistance to side movement of the pin and deformation of the chain. In the prior art cutter chains, the most used connection was by means of connector links having an opening at each end carrying a carburized bushing, a carburized pin with circular ends, a circular opening at each end of the cutter link receiving the circular ends of the pin in a press fit sufficient to prevent its rotation and a locking member running through the pin and attaching in grooves in the side straps of the cutter link. This structure, while the most satisfactory to date, has many deficiencies. The form and method of locking the pin weakened both the cutter link and the pin itself, provided poor lubrication, and its pitch life was relatively short. In addition, the use of a bushing reduced the size of pin which could be used without excessive weakening of the chain.

In the present invention we have invented a mine machine cutter chain structure which eliminates these problems. In the chain of our invention, we eliminate the use of notches, grooves and other weakening elements in the side straps of the cutter links as well as eliminating the use of bushings. We, by our structure, take advantage of the lubricating effect of particulate coal by causing the side straps of the cutter link to move on the pin rather than fixing the pin in the side straps and moving the connector link on the pin.

In a preferred embodiment of our invention we provide a cutter chain having toothed cutter links with spaced side straps having circular pin openings at each end, a connector link fitting between the side straps of said cutter links and having like pin openings at each end, a chordal passage at each said opening in the connector link, a locking pin in each passage and a connector pin slidably received in said pin openings in said cutter link and press fit into said connector links and having an annular groove receiving the locking pin. Preferably, said pin and side straps are differentially hardened to two different hardness levels. The locking pin is preferably a spiral lock pin or the like expanding pin which is frictionally retained in place.

In the foregoing general description of our invention we have set out certain objects, purposes and advantages of our invention. Other objects, purposes and advantages will be apparent from a consideration of the following description and the accompanying drawings in which:

FIGURE 1 is an exploded isometric view of a cutter chain according to our invention;

FIGURE 2 is a top plan view of the segment of cutter chain of FIGURE 1; and

FIGURE 3 is a side elevation view of the segment of FIGURE 1.

Referring to the drawings we have illustrated a cutter link 10 having spaced, parallel side straps 11 and 12 provided with paired circular openings 13, 14 and 15, 16 at the ends thereof and spaced apart by a tool holder or bit block 10a. A connector link 17 provided with circular openings 18 and 19 at the ends thereof is adapted to have its ends inserted between the side straps 11 and 12 of the cutter link with one of openings 18 and 19 aligned with one pair of openings 13, 14 or 15, 16. A cylindrical pin 20 is adapted to slide through the aligned openings in the side straps 11 and 12 and is pressed into the connector link 17 and is held in place by the press fit in connector link 17 and by a spiral lock pin 21 passing through passage 22 chordally intersecting each of openings 18 and 19 and engaging an annular groove 23 in pin 20 to prevent its removal.

The pin 20 and side straps 11 and 12 are preferably differentially hardened so as to provide a bearing effect for relative movement between the two parts and lubrication by fine particle coal which tends to work into the area between the moving surfaces.

It will be immediately recognized by men skilled in the art that the above described structure has many advantages over prior art cutter chain structures, that lubrication can be automatically provided by the coal itself, that the problem of bearing crushing is eliminated with its attendant chain deformation, that the problems of cutter link cracking are materially reduced and that size of pins and their effective bearing area considerably enlarged.

While we have illustrated and described a presently preferred embodiment of our invention, it will be understood that this invention may be otherwise embodied within the scope of the following claims.

We claim:
1. A mining machine cutter chain having cutter links having an elongated slot at each end and having circular pin openings at each end, a connector link fitting within said slots and having corresponding openings at each end, a connector pin slidable in and bearing directly against said link openings and said cutter link pin openings and removable locking means between said connector link and connector pin holding said pin against removal, said pin being freely rotatable in the cutter link pin openings.

2. A cutter chain as claimed in claim 1 wherein the locking means is a chordal passage intersecting each of the openings, an annular groove in the connector pin intermediate its ends and a locking pin in said passage engaging said annular groove.

3. A cutter chain as claimed in claim 1 wherein the cutter link and connector pin are of different hardness values.

4. A cutter chain as claimed in claim 1 wherein the elongated slots are formed by spaced parallel side straps having openings at each end.

5. A cutter chain as claimed in claim 4 wherein the side straps and connector pin are of different hardness values.

6. A cutter chain as claimed in claim 1 wherein the connector pin is slidable in said cutter link openings and is a press fit in said connector link openings.

References Cited

UNITED STATES PATENTS

| | | | |
|---|---|---|---|
| 2,226,989 | 12/1940 | Young | 74—254 X |
| 2,612,056 | 9/1952 | Prox et al. | 74—254 |
| 3,309,864 | 3/1967 | Arndt et al. | 74—254 X |

ERNEST R. PURSER, Primary Examiner

U.S. Cl. X.R.

299—82